(12) United States Patent
Alekel et al.

(10) Patent No.: US 8,743,453 B2
(45) Date of Patent: Jun. 3, 2014

(54) METHOD AND APPARATUS FOR PULSED HARMONIC ULTRAVIOLET LASERS

(71) Applicant: Deep Photonics Corporation, Bend, OR (US)

(72) Inventors: Theodore Alekel, Portland, OR (US); David A. Dutton, Corvallis, OR (US); David H. Foster, Corvallis, OR (US); Joseph G. LaChapelle, Philomath, OR (US); Michael J. Munroe, Eugene, OR (US)

(73) Assignee: Deep Photonics Corporation, Bend, OR (US)

( * ) Notice: Subject to any disclaimer, the term of this patent is extended or adjusted under 35 U.S.C. 154(b) by 0 days.

(21) Appl. No.: 13/627,887

(22) Filed: Sep. 26, 2012

(65) Prior Publication Data
US 2013/0135711 A1    May 30, 2013

Related U.S. Application Data

(60) Continuation of application No. 12/954,306, filed on Nov. 24, 2010, now abandoned, which is a division of application No. 12/184,199, filed on Jul. 31, 2008, now Pat. No. 7,852,549.

(60) Provisional application No. 60/953,402, filed on Aug. 1, 2007, provisional application No. 60/975,804, filed on Sep. 27, 2007.

(51) Int. Cl.
G02F 1/35         (2006.01)
G02F 2/02         (2006.01)

(52) U.S. Cl.
USPC ............... 359/328; 359/326; 372/22; 372/97; 372/105

(58) Field of Classification Search
USPC .......... 359/326–332; 372/21–22, 92, 97–106; 385/122
See application file for complete search history.

(56) References Cited

U.S. PATENT DOCUMENTS

| 5,633,883 | A  * | 5/1997  | Shi et al. ........................... 372/20 |
| 7,643,529 | B2 * | 1/2010  | Brown et al. ..................... 372/55 |
| 2005/0238070 | A1 * | 10/2005 | Imeshev et al. .................. 372/21 |
| 2006/0054864 | A1 * | 3/2006  | Alekel et al. ............. 252/301.4 R |
| 2007/0211773 | A1 * | 9/2007  | Gerstenberger et al. ........ 372/22 |

* cited by examiner

*Primary Examiner* — Daniel Petkovsek
(74) *Attorney, Agent, or Firm* — Kilpatrick Townsend & Stockton LLP

(57) ABSTRACT

An apparatus for producing coherent, pulsed ultraviolet light with pulse durations that range between 1 ps and 1 μs includes one or more source lasers in the visible or near-infrared frequency range. The apparatus also includes one or more FC stages, at least one of the one or more FC stages including a nonlinear FC device and one or more optical elements. The optical elements include a reflector, a focusing element, a polarization-controlling optic, a wavelength separator, or a fiber optic component. The FC device includes a huntite-type aluminum double borate nonlinear optical material configured to produce FC light having a wavelength between 190 and 350 nm and a composition given by $RAl_3B_4O_{12}$, where R comprises one or a plurality of elements {Sc, La, Y, Lu}. The nonlinear optical material is characterized by an optical transmission greater than 70% over the wavelength range of 190 to 350 nm.

9 Claims, 8 Drawing Sheets

METHOD AND APPARATUS FOR PULSED HARMONIC ULTRAVIOLET LASERS

CROSS-REFERENCES TO RELATED APPLICATIONS

This application is a continuation of U.S. patent application Ser. No. 12/954,306, filed on Nov. 24, 2010; now abandoned, which is a division of U.S. patent application Ser. No. 12/184,199, filed on Jul. 31, 2008, now U.S. Pat. No. 7,852,549, issued Dec. 14, 2010; which claims benefit under 35 U.S.C. §119(e) of U.S. Provisional Patent Application No. 60/953,402, filed on Aug. 1, 2007 and claims the benefit under 35 U.S.C. §119(e) of U.S. Provisional Patent Application No. 60/975,804, filed on Sep. 27, 2007. The disclosures are hereby incorporated by reference in their entirety for all purposes.

BACKGROUND OF THE INVENTION

The present invention relates generally to high performance laser sources internally using nonlinear optical processes to convert laser light to greater frequencies. Merely by way of example, embodiments of the present invention provide an apparatus useful for generating coherent pulsed ultraviolet (UV) light with wavelengths that range between 190 and 350 nm, pulse durations that range between 1 ps and 300 ps, and 10 million or more pulses per second. As another example, embodiments of the present invention provides an apparatus useful for generating pulses of durations lying between 300 ps and 100 ns and occurring 100 thousand to 5 million times each second. In yet another example, pulse packets of a plurality of shorter pulses, each packet having a duration between 1 ns and 1 μs with 100 thousand to 100 million packets occurring each second. However, the scope of the present invention is not limited to this particular implementation and has a broader range of applicability.

Ultraviolet lasers that emit light in the wavelength range 190-350 nm are in increasing demand for many industrial and research applications. UV sources have greater resolving power than visible or near-infrared (NIR) sources, so they are desired for applications requiring high-resolution imaging or scattering. UV sources also have greater energy per photon than visible or NIR sources, and thus they enable many applications that necessitate removal or modification of materials.

Aside from exciplex lasers, in which UV light is directly produced from electronic transitions, ultraviolet lasers use frequency conversion (FC) of at least one lower frequency source laser. Frequency conversion processes include second harmonic generation (SHG), sum frequency generation (SFG), and difference frequency generation (DFG). Frequency-converted lasers contain one or more source lasers, the outputs of which are directed into one or more FC stages of SHG or SFG. These stages are often cascaded in a serial fashion to obtain sequentially higher frequencies. SHG stages convert a portion of the input light into light at a frequency of twice the input light (a wavelength of half of the input light). SFG stages take input light at two different frequencies and convert some of this input light into light at a frequency that is the sum of the input frequencies.

The SHG and SFG FC stages are implemented by using special nonlinear optical (NLO) materials that generate higher frequency light by processes that are now satisfactorily understood and that are categorized under the topic "nonlinear optics." In many cases the NLO device is a single crystal of a nonlinear optical material that has been precisely cut and oriented to operate for a select purpose. Examples of NLO devices which are more complicated than a single crystal include periodically poled quasi-phase-matching (QPM) devices, devices with walk-off compensation, and the optical contacting of two NLO materials together to implement two FC stages in a single optical component. Great care is taken in order for NLO devices to meet the phase-matching condition, a physical requirement relating to material orientation, orientation of the input beam(s), polarization of the input beam(s), and material temperature. A number of strategies for phase-matching are known in the art, including critical phase-matching, non-critical phase-matching (NCPM), and quasi-phase-matching.

The energy efficiency at which a SHG stage converts light to the second harmonic (SH) increases greatly when the time-averaged input power is delivered in short pulses of high peak power rather than as a continuous wave (CW) of constant magnitude. In fact, when the stage is operating in the regime of low conversion efficiency (below 10%), as is often the case due to various constraints, the conversion efficiency at fixed time-averaged input power is approximately inversely proportional to the duty cycle of the pulsed source. Therefore, it is greatly advantageous to use pulsed sources instead of CW sources in frequency-converted laser systems. In practice, FC laser systems that use CW sources require the use of cavity resonators to enhance the input field strength by constructive interference of circulating laser radiation. While intracavity insertion of a FC device can be made sufficiently robust within a laser gain cavity, external Fabry-Perot external resonators are extremely sensitive to alignment and perturbations. Such cavities pose significant engineering challenges, requiring fast opto-mechanical control and extreme measures to fight thermal and vibrational noise. The engineering is extraordinarily difficult when consecutive resonant cavities are coupled to accomplish higher order optical harmonics.

An ideal solution for many applications that nominally require a CW UV laser is to use rapidly pulsed sources, known as quasi-continuous wave (QCW) sources, in a frequency-converted laser system. The pulsed output signal of such a laser system will appear as a "continuous wave" as long as the repetition rate is higher than the response frequency of the physical system in which it is used. QCW frequency-converted laser apparatuses have the advantage of high source peak power, and thus better internal frequency conversion, while having a high enough repetition rate to appear "CW" in the applications in which they are used.

Typical QCW laser systems use mode-locking techniques. Mode-locking creates a coherent pulse by using constructive interference of the phase-locked laser cavity modes. A major advantage of mode-locking is the ability to maintain a stable output over time. The pulse width will determine the peak power at a fixed repetition rate predefined by the cavity length. A semiconductor saturable mirror (SESAM) is an example of a passive device used for mode-locked lasers which provides short pulse lengths. These devices are self-starting mode-locking components. Other technologies for mode-locking include active types such as frequency modulators (electro-optic effect), amplitude modulators (acousto-optic effect), and passive Kerr lens mode-locking. Pulse lengths produced are typically less than tens of picoseconds (ps) and greater than hundreds of femtoseconds (fs). This pulse length and repetition rate will give the desired characteristics for a QCW source.

An example of a laser system described in U.S. Pat. No. 7,088,744 consists of a mode-locked diode-pumped solid state (DPSS) laser source that uses a conventional laser gain crystal in a Fabry-Perot optical cavity. A SESAM is employed intracavity to modulate gain. An optional frequency converter may be installed intracavity as well, converting a 1064 nm fundamental wavelength to 532 nm by using a NCPM lithium triborate (LBO) crystal. The output 532 nm laser beam can then be used as a source for another FC stage that converts to a wavelength of 266 nm. This entire process forms a mode-locked UV QCW laser system.

Frequency conversion generally benefits from both high peak powers and tightly focused input beams, both of which increase the intensity of the input and output beams within the nonlinear optical material. One of the most important factors that limit the usefulness of frequency-converted UV laser systems is the lifetime of NLO materials under conditions for UV production. Commercial UV NLO devices of prior art are generally fabricated from BBO and CLBO crystals. These NLO devices are unable to support long term, high-output UV light because of their intrinsic weakness in the presence of moisture. Water reacts with the material's surfaces, and penetrates into its bulk, causing breakdown in high intensity laser beams. This failure mode is addressed in some systems by environmental isolation with hermetic cells, elevated temperatures to reduce water sorption, purging dry gasses, and mechanical devices to shift the position of the crystal relative to the laser beam. Every method attempts to overcome the intrinsic faults of BBO and CLBO and resolve longevity issues of the UV NLO process, but with varying degrees of inadequate success. Thus, there is a need in the art for a UV frequency converter that is impervious to water.

A related consequence to the hygroscopic nature of BBO and CLBO: these NLO materials are limited in the degree to which they are able to support high intensity radiation. With activation energy supplied by high intensity input beams, surface damage on the polished faces is quickly promoted in the presence of water. The degradation propagates along the beam path into the bulk device, driven by the high intensity laser beam. This phenomenon limits the amount and duration of input laser radiation through the frequency converter. As a result, conversion efficiencies remain well below optimum and device operational lifetimes are significantly compromised.

It has also been demonstrated that FC efficiency in NLO devices to generate UV light reaches a threshold where increased input intensity does not produce the expected UV output energy. This condition is accounted for by a phenomenon of thermal dephasing where optical absorption within the NLO device leads to localized heating; this causes the refractive indices of the material to change with changing temperature and thereby disrupts optimal phase-matching conditions within the device. Thus, there is a need in the art for methods to reduce thermal dephasing.

SUMMARY OF THE INVENTION

The present invention relates generally to a laser apparatus that produces coherent pulsed UV light with wavelengths that range between 190 and 350 nm, a QCW implementation with pulse durations that range between 1 ps and 300 ps, and 10 million or more pulses that are delivered each second, a pulsed implementation with pulse durations lying between 300 ps and 100 ns and occurring 100 thousand to 5 million times each second, and a gated pulse packet implementation that contains a plurality of shorter pulses, each packet having a duration between 1 ns and 1 µs with 100 thousand to 100 million packets occurring each second. More particularly, the apparatus contains one or more source lasers that emit visible to near-infrared light and uses FC stages to convert a portion of the light from the source laser(s) into the output light at UV wavelengths. The conversion process may or may not involve intermediate light frequencies and multiple FC stages. More specifically, at least one of the FC processes that produces 190-350 nm UV light during the operation of the apparatus by way of a NLO device that consists wholly or partially of a huntite-type aluminum double borate material, having a composition given by $RAl_3B_4O_{12}$ where R is comprised of one or a plurality of the elements {Sc, La, Y, Lu}, and the material optically transmits deep ultraviolet (DUV) radiation.

According to an embodiment of the present invention, an apparatus for producing coherent, pulsed ultraviolet light with pulse durations that range between 1 ps and 1 µs is provided. The apparatus includes one or more source lasers in the visible or near-infrared frequency range and one or more FC stages including a nonlinear FC device. The one or more FC stages also include one or more optical elements including: a reflector, a focusing element, a polarization-controlling optic, a wavelength separator, or a fiber optic component. The FC device includes a huntite-type aluminum double borate nonlinear optical material configured to produce frequency converted light having a wavelength between 190 and 350 nm. The huntite-type aluminum double borate nonlinear optical material has a composition given by $RAl_3B_4O_{12}$, where R includes one or a plurality of elements {Sc, La, Y, Lu}. The huntite-type aluminum double borate nonlinear optical material is characterized by an optical transmission greater than 70% over the wavelength range of 190 to 350 nm.

According to another embodiment of the present invention, an apparatus for producing coherent, pulsed, ultraviolet light is provided. The apparatus includes one or more source lasers configured to provide visible or near-infrared output radiation. The apparatus also includes one or more FC stages including a nonlinear FC device and one or more optical elements. The one or more optical elements include a reflector, a focusing element, a polarization-controlling optic, a wavelength separator, or a fiber optic component. The nonlinear FC device includes a nonlinear optical material producing frequency converted light having a wavelength between 190 and 350 nm. The nonlinear optical material experiences a local peak intensity greater than 5 $GW/cm^2$ during operation.

According to a specific embodiment of the present invention, an apparatus for producing coherent, pulsed, ultraviolet light is provided. The apparatus includes one or more source lasers with visible or near-infrared output radiation and one or more FC stages including a nonlinear FC device and one or more optical elements. The one or more optical elements include a reflector, a focusing element, a polarization-controlling optic, a wavelength separator, or a fiber optic component. The nonlinear FC device includes a nonlinear optical material configured to produce frequency converted light having a wavelength between 190 and 350 nm. Additionally, the nonlinear optical material operates with a time-averaged local optical intensity greater than about 50 $MW/cm^2$.

According to another specific embodiment of the present invention, an apparatus for producing coherent, pulsed, ultraviolet light is provided. The apparatus includes one or more source lasers emitting radiation in the visible or near-infrared frequency range and one or more FC stages. The one or more FC stages include a nonlinear FC device configured to receive light propagating along a propagation axis and one or more optical elements including: a reflector, a focusing element, a polarization-controlling optic, a wavelength separator, or a fiber optic component. The nonlinear FC device includes a thermally-conducting mount having a first side, a second side opposing the first side and a passage extending from the first side to the second side. The passage defines a mounting surface. The nonlinear FC device also includes a nonlinear optical crystal having opposing facets having a component perpendicular to the propagation axis and an exterior surface extending between the opposing facets at a periphery of the nonlinear optical crystal. The nonlinear optical crystal is mounted in the thermally-conducting mount. The nonlinear FC device further includes a solder containing a metal material disposed between the mounting surface of the thermally-conducting mount and the exterior surface of the nonlinear optical crystal.

An apparatus and method are provided for generating a laser beam of coherent pulsed ultraviolet (UV) light with wavelengths that range between 190 and 350 nm, pulse durations that range between 1 ps and 1 µs, and 10 million or more pulses that are delivered each second. The apparatus contains one or more source lasers that emit visible to near-infrared light and uses FC stages to convert a portion of the light from the source laser(s) into UV radiation. At least one of the FC processes that produces 190-350 nm UV light during the operation of the apparatus occurs by way of a NLO device that consists wholly or partially of a huntite-type aluminum double borate material, having a composition given by $RAl_3B_4O_{12}$ where R is comprised of one or a plurality of the elements {Sc, La, Y, Lu}, and the material optically transmits DUV radiation. The laser apparatus may also contain a nonlinear material comprising at least one FC stage that produces light by a NLO device where the operating optical pulse peak intensity is locally greater than about 5 $GW/cm^2$ and/or the time averaged optical intensity is locally greater than about 50 $MW/cm^2$. Also described is a method for effective thermal contacting and control of a nonlinear crystal used in such an apparatus.

In another embodiment, the laser apparatus contains a nonlinear material comprising at least one FC stage that produces light by a NLO device where the operating optical pulse peak intensity is locally greater than about 5 $GW/cm^2$ and/or the time averaged optical intensity is locally greater than about 50 $MW/cm^2$.

In yet another embodiment, the laser apparatus contains a nonlinear material comprising at least one FC stage that produces light by a NLO device and is mounted in thermally-molded metallic form for enhanced thermal contact and conduction under operational load.

According to an embodiment of the present invention, an apparatus for producing coherent, pulsed ultraviolet light with wavelengths that range between 190 and 350 nm, pulse durations that range between 1 ps and 1 µs, and 10 million or more pulses that are delivered each second is provided. The apparatus includes one or more source lasers in the visible or near-infrared frequency range, one or more FC stages that incorporate one or a plurality of reflectors, focusing means, polarization-controlling optics, wavelength separation means, fiber optic components, and nonlinear FC devices, and at least one of the FC stages that uses a huntite-type aluminum double borate nonlinear optical material to produce light. The light may or may not be the output light of the apparatus. The light has a wavelength between 190 and 350 nm. The huntite-type aluminum double borate material has a composition given by $RAl_3B_4O_{12}$, where R is comprised of one or a plurality of the elements {Sc, La, Y, Lu}. The huntite-type aluminum double borate material optically transmits DUV radiation.

According to an alternative embodiment, at least one of the FC stages that produces light having wavelength between 190 and 350 nm uses a huntite-type aluminum double borate material having a composition given by $Y_{(1-x)}La_xAl_3B_4O_{12}$, with $0 \le x \le 0.4$. Alternatively, at least one of the FC stages that produces light having wavelength between 190 and 350 nm uses a huntite-type aluminum double borate material having a composition given by $Lu_{(1-x)}La_xAl_3B_4O_{12}$, with $0 \le x \le 0.4$. Alternatively, at least one of the FC stages that produces light having wavelength between 190 and 350 nm uses a huntite-type aluminum double borate material having a composition given by $YAl_3B_4O_{12}$.

In an embodiment, radiation from a single source laser undergoes one stage of second harmonic generation that uses the huntite-type aluminum double borate material in the production of light at a wavelength between 190 and 350 nm. Alternatively, radiation from a single source laser undergoes two stages of second harmonic generation, the second stage using the huntite-type aluminum double borate material in the production of light at a wavelength between 190 and 350 nm. Alternatively, radiation from a single source laser undergoes one stage of second harmonic generation followed by one stage of sum frequency generation, the last stage using the huntite-type aluminum double borate material in the production of light at a wavelength between 190 and 350 nm. Alternatively, radiation from a single source laser undergoes two stages of second harmonic generation followed by a stage of sum frequency generation, the last stage using the huntite-type aluminum double borate material in the production of light at a wavelength between 190 and 350 nm.

In a particular embodiment, a single source laser having nominal angular frequency ω is used, and the output beam, which may or may not contain light at the source frequency, contains a significant quantity of light at one or more of the following nominal angular frequencies: 2ω, 3ω, 4ω, 5ω, 6ω, 7ω, 8ω. At least one device of the huntite-type aluminum double borate material may be a single crystal oriented so that light at one or more of frequencies involved in a FC process enters and/or exits a surface of the material near Brewster's angle and with nominal p-polarization relative to this surface, thus reducing loss. At least one device of the huntite-type aluminum double borate material may be optically coated on the entrance and/or exit faces in such a way so as to reduce Fresnel reflective losses to less than 3% per surface at one or more of the harmonic frequencies and thereby reduce loss. A fiber laser is used as one of the source lasers in an embodiment and a diode-pumped solid-state laser is used as one of the source lasers in another embodiment.

The apparatus may be incorporated into an optical system for defect detection: specifically for bright field illumination, dark field illumination, and photomask, reticle, wafer, and/or glass inspection. The apparatus may be incorporated into a micromachining system for the purpose of cutting, drilling, ablating, melting, scribing, or optically treating a variety of conductors, semiconductors, or dielectric materials such as semiconductors, semiconductor wafers, photovoltaics, metals, ceramics, plastics, glasses, amorphous materials, thin films, or crystals. The apparatus may be incorporated into an optical instrument for identification, qualitative, and/or quantitative analyses of physical phenomena that include the techniques of interferometry, scatterometry, and/or spectroscopy. The apparatus may be incorporated into an optical system for identification, qualitative, and/or quantitative analyses of biological samples that include capillary electrophoresis, cytology, DNA manipulation, and/or flow cytometry. The apparatus may be incorporated into an optical system that couples the directed optical energy of the laser apparatus with a target material for the purpose of generating extreme ultraviolet electromagnetic radiation of wavelengths in the range 1-100 nm. The apparatus may be incorporated into an optical system that couples the directed optical energy of the laser apparatus with a target material for the purpose of generating terahertz electromagnetic radiation of wavelengths in the range 10-300 μm.

According to a specific embodiment of the present invention, an apparatus for producing coherent, pulsed, ultraviolet light includes one or more source lasers with visible or near-infrared output radiation; one or more FC stages that incorporate one or a plurality of reflectors, focusing means, polarization-controlling optics, wavelength separation means, fiber optic components, and nonlinear FC devices; and at least one of the FC stages that uses a nonlinear optical material to produce light, which may or may not be the output light of the apparatus, having a wavelength between 190 and 350 nm. The nonlinear optical material in an FC stage may operate with a local peak optical intensity in the range of about 5-10 $GW/cm^2$. The local maximum optical intensity in a FC stage may be in the operational range of about 10-20 $GW/cm^2$. The local maximum optical intensity in a FC stage may be in the operational range of about 20-30 $GW/cm^2$. The local maximum optical intensity in a FC stage may be in the operational range of about 30-50 $GW/cm^2$. In an embodiment, the local maximum optical intensity in a FC stage with a local peak optical intensity is greater than 50 $GW/cm^2$.

At least one of the nonlinear optical components in a FC stage may be composed wholly or partially of a huntite-type aluminum double borate material having a composition given by $RAl_3B_4O_{12}$ where R is comprised of one or a plurality of the elements {Sc, La, Y, Lu}. At least one of the nonlinear optical components in a FC stage may have a composition given by $Y_{(1-x)}La_xAl_3B_4O_{12}$, with $0 \leq x \leq 0.4$. At least one of the FC stages may produce light having a wavelength between 190 and 350 nm that uses a huntite-type aluminum double borate material having a composition given by $Lu_{(1-x)}La_xAl_3B_4O_{12}$, with $0 \leq x \leq 0.4$. At least one of the nonlinear optical components in a FC stage may have a composition given by $YAl_3B_4O_{12}$.

In an embodiment, a single source laser having nominal angular frequency w is used, and the output beam, which may or may not contain light at the source frequency, contains a significant quantity of light at one or more of the following nominal angular frequencies: 2ω, 3ω, 4ω, 5ω, 6ω, 7ω, 8ω.

According to another specific embodiment of the present invention, an apparatus for producing coherent, pulsed, ultraviolet light includes one or more source lasers with visible or near-infrared output radiation; one or more FC stages that incorporate one or a plurality of reflectors, focusing means, polarization-controlling optics, wavelength separation means, fiber optic components, and nonlinear FC devices; and at least one of the FC stages that uses a nonlinear optical material to produce light. The light may or may not be the output light of the apparatus. The light has a wavelength between 190 and 350 nm. The nonlinear optical material may operate with a time-averaged local optical intensity in the range greater than 50 $MW/cm^2$. In various embodiments, the embodiment, the time-averaged local optical intensity may range from 50-100 $MW/cm^2$, 100-250 $MW/cm^2$, 250-500 $MW/cm^2$, or be greater than about 500 $MW/cm^2$.

According to an alternative embodiment of the present invention, an apparatus for producing coherent, pulsed, ultraviolet light is provided. The apparatus includes one or more source lasers that emit radiation in the visible or near-infrared frequency range and one or more FC stages that incorporate a plurality of reflectors, focusing means, polarization-controlling optics, wavelength separation means, fiber optic components, and nonlinear FC devices. One or more of the FC stages uses a nonlinear optical material to produces light, which may or may not be the output light of the apparatus, having a wavelength between 190 and 350 nm. The nonlinear optical material experiences an average optical intensity greater than 50 $MW/cm^2$ during operation. The apparatus further includes one or a plurality of thermally-conducting crystal mount components that partially encapsulate the nonlinear optical device so as to minimize gaps over the its contact area, maximize the surface contact area with the nonlinear optical device, maintain a transparent propagation axis through the device, and maximize thermal conduction between the mount and the crystal. The apparatus further includes a metal solder that fills the gaps between the mechanical thermally-conductive mount and the surfaces of the nonlinear optical device, melts below 900 K, and combines with a wetting or fluxing agent that is water- or solvent-soluble so as to remove the wetting or fluxing agent from the assembly by rinsing the mount and nonlinear optical device with water or a solvent and leaving the nonlinear optical device laser beam propagation entrance and exit surfaces clean.

One embodiment reduces or neutralizes the thermal dephasing by intimately mounting the device in a fixture that couples and dissipates the residual heat in a manner that equalizes the thermal gradient along the propagating laser beam.

In an embodiment, at least one of the nonlinear optical components in a FC stage is composed wholly or partially of a huntite-type aluminum double borate material having a composition given by $RAl_3B_4O_{12}$ where R is comprised of one or a plurality of the elements {Sc, La, Y, Lu}. In another embodiment, at least one of the FC stages that produces light having wavelength between 190 and 350 nm uses a huntite-type aluminum double borate material having a composition given by $Y_{(1-x)}La_xAl_3B_4O_{12}$, with $0 \leq x \leq 0.4$. In yet another embodiment, at least one of the FC stages that produces light having wavelength between 190 and 350 nm uses a huntite-type aluminum double borate material having a composition given by $Lu_{(1-x)}La_xAl_3B_4O_{12}$, with $0 \leq x \leq 0.4$. In a particular embodiment, at least one of the FC stages that produces light having wavelength between 190 and 350 nm uses a huntite-type aluminum double borate material having a composition given by $YAl_3B_4O_{12}$.

The apparatus may provide pulse durations that range between 1 ps and 1 μs. The huntite-type aluminum double borate material may have a composition given by $R_xAl_3B_4O_{12}$, where R is comprised of one or a plurality of the elements {Sc, La, Y, Lu}, x ranges from 0.9 to 1.1.

Numerous benefits are achieved using the present invention over conventional techniques. For example, an embodiment according to the present invention provides a laser apparatus producing UV pulses useful for manufacturing operations. Additionally, embodiments described herein provide increases in operating lifetime and reliability in comparison with conventional designs. The incorporation of a novel UV frequency converter crystal, fabricated from the materials described herein, into a pulsed laser system provides for increased DUV output compared with conventional lasers. The novel UV FC device is also mechanically robust, allowing it to be affixed to a thermally-conductive mount with metallic solder. Thus, embodiments of the present invention provide for a predetermined thermal environment for the FC device that reduces thermal dephasing effects when subjected to high optical input powers. Depending upon the embodiment, one or more of these benefits may exist. These and other benefits have been described throughout the present specification and more particularly below.

DETAILED DESCRIPTION OF SPECIFIC EMBODIMENTS

Figure 1:
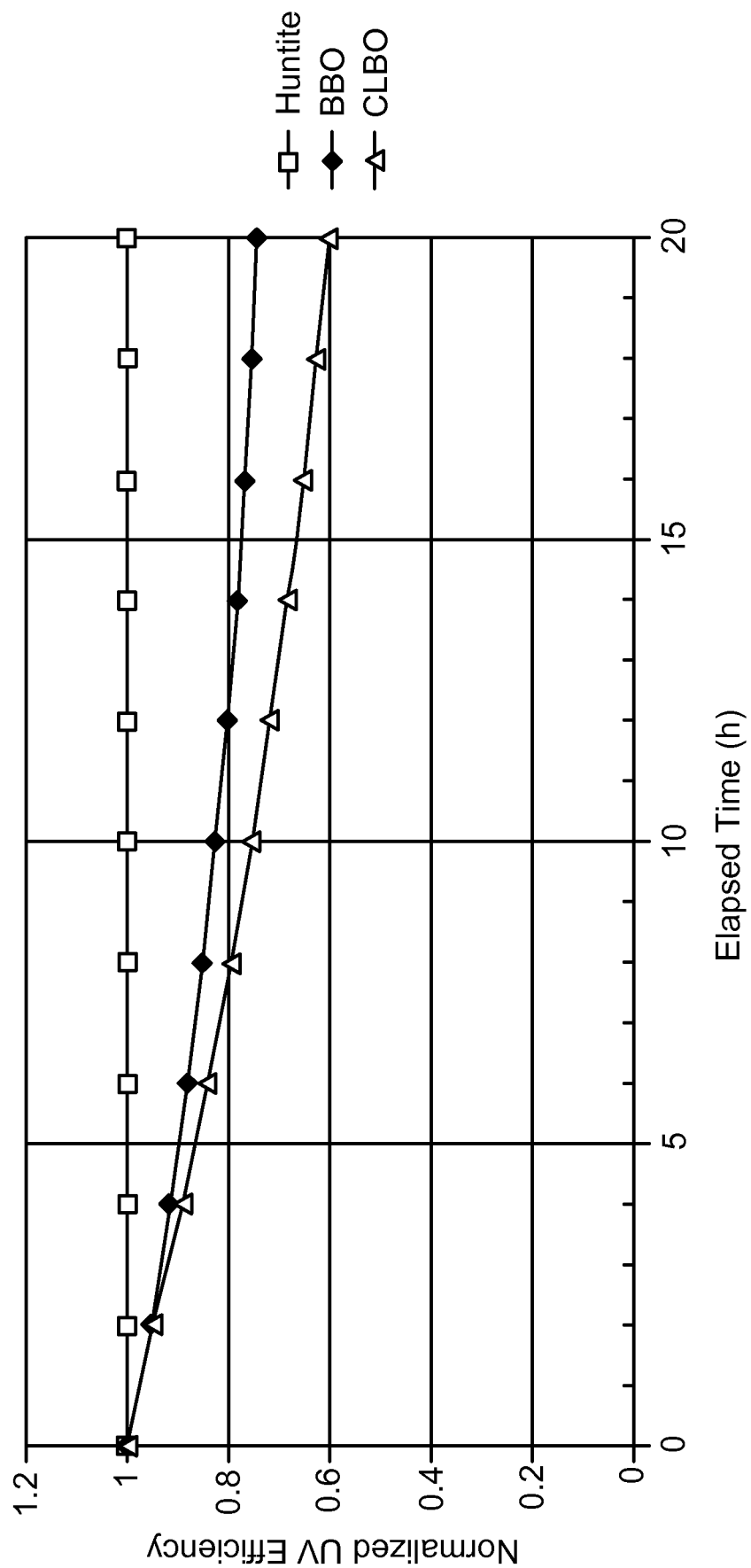
FIG. 1 demonstrates typical time-dependent behavior for SHG of UV light in conventional materials compared to material provided by an embodiment of the present invention.

Without limiting embodiments of the present invention, the following glossary is provided in relation to the description herein.

Brewster's angle: The angle of incidence, relative to a given interface between two materials with a given choice of which side of the interface is the incident side, for which light that is polarized having its electric field lying in the plane of incidence is theoretically transmitted through the interface with none of the light being reflected. The special polarization is sometimes referred to as p-polarization or TM polarization.

Cavity: An optical path defined by two or more reflecting surfaces, or by a waveguide or a fiber, along which light can reciprocate or circulate. Objects that intersect the optical path are said to be within the cavity.

Continuous wave (CW) laser: A laser that emits radiation continuously in time rather than in short bursts, as in a pulsed laser.

Deep ultraviolet (DUV): A portion of the electromagnetic spectrum with wavelengths in the range of 100-315 nm.

Diode Laser: refers to a light-emitting diode designed to use stimulated emission to generate a coherent light output. Diode lasers are also known as laser diodes or semiconductor lasers.

Diode-Pumped Laser: refers to a laser having a gain medium that is pumped by a diode laser.

Extreme Ultraviolet (EUV): refers to a portion of the electromagnetic spectrum with wavelengths in the range of 1-100 nm.

Facet: refers to a surface on an optical device wherein rays of light are able to enter or exit the device through the facet surface with sufficient optical transmission efficiency so as to enable device operation.

Frequency Conversion or Frequency Converter (FC): refers to a nonlinear optical device that harmonically generates light.

Harmonic Generation: With relation to radiant energy, the conversion of electromagnetic radiation having a given frequency into radiation having a multiple of the frequency. This can occur when an intense directional light beam passes through a nonlinear optical medium.

Infrared Radiation: refers to electromagnetic radiation characterized by a wavelength between about 700 nm and about 5000 nm.

Laser: refers to an acronym of light amplification by stimulated emission of radiation. A laser is a cavity that contains any material—crystal, glass, liquid, dye or gas—where an atom of which are capable of being excited to a metastable electronic state by a pumping energy e.g., by light or an electric discharge. The light emitted by the atom's electron as it returns to its energetic ground state is able to promote stimulated emission of other atoms in the medium. The light (referred to herein as stimulated radiation) is continually increased in intensity as it makes multiple round trips through the cavity.

Light: refers to electromagnetic radiation in a range of frequencies running from infrared through the ultraviolet, nominally corresponding to a range of wavelengths from about 100 nm to about 15 μm; optical radiation.

Linewidth: a) The range of frequencies or wavelengths over which radiations are absorbed or emitted in a transition between a specific pair of atomic energy levels. The full width is determined between half-power points of the line, b) In a laser, the range of frequencies over which most of the beam energy is distributed.

Near Infrared Radiation: refers to electromagnetic radiation characterized by a wavelength between about 700 nm and about 2000 nm.

Nonlinear effect: refers to a class of optical phenomena that can typically be viewed only with nearly monochromatic, directional beams of light, such as those produced by a laser. Harmonic generation (e.g., second-, third-, fourth-harmonic generation, and the like), optical parametric oscillation, sum-frequency generation, difference-frequency generation, optical parametric amplification, and the stimulated Raman effect are examples.

Nonlinear material: refers to materials that possess a non-zero nonlinear dielectric response to optical radiation that can give rise to nonlinear effects. Examples of nonlinear materials include crystals of lithium niobate ($LiNbO_3$), lithium triborate ($LiB_3O_5$ or LBO), beta-barium borate ($\beta$-$BaB_2O_4$ or BBO), cesium lithium borate ($CsLiB_6O_{10}$ or CLBO), yttrium aluminum borate ($YAl_3B_4O_{12}$) and its isomorphs, as well as quasi-phase-matched materials.

Phase-matching: refers to the technique used in a multi-wave nonlinear optical process to enhance the distance over which the desired transfer of energy between the waves is possible. For example, a three-wave process is said to be phase-matched when $k_1+k_2=k_3$, where $k_i$ is the wave vector of the $i^{th}$ wave participating in the process. In frequency doubling, e.g., the process is most efficient when the fundamental and the second harmonic phase velocities are matched.

Pulse width: refers to the time or duration of the pulse emitted by a pulsed laser, in seconds. Also referred to as pulse length.

Quasi-Phase-matched (QPM) Material: when the fundamental and higher harmonic radiation are not phase-matched, but a QPM grating compensates. In a QPM material, the fundamental and higher harmonic can have identical polarizations, often improving efficiency. Examples of quasi-phase-matched materials include periodically-poled lithium tantalate, periodically-poled lithium niobate (PPLN) or periodically-poled potassium titanyl phosphate (PPKTP).

Source laser: A laser that is used as a light source of one or more FC stages. The source laser(s) may be commercial products themselves, or may be constructed as an integral part of the UV laser apparatus, perhaps integrated so that the source lasers do not appear as separate physical units. (If a commercial source laser unit contains one or more FC stages that are external to the cavity in which lasing occurs, then the term "source laser," as used in this document, refers to the portion of the commercial source laser in which lasing occurs. In this case the external FC portion of the commercial source is included as part of the FC portion of the UV laser apparatus as a whole.)

Terahertz (THz) radiation: refers to a portion of the electromagnetic spectrum with wavelengths in the range of 10-300 μm.

Waist: 1) The narrowest point of a nominally Gaussian beam; 2) the Gaussian beam radius at the narrowest point. The Gaussian beam radius is the radius at which the intensity of a nominally Gaussian beam is $1/e^2$ of the central, peak intensity.

A number of prominent applications require UV lasers with the ability of producing pulses that uniquely emit coherent radiation with a combination of all the following properties: stable linear polarization, high peak power, pulse durations from 1 ps to 1 μs, narrow spectral bandwidth, and predominately one spatial mode. The sum of these properties is beneficial for efficient laser FC with NLO optical devices. Also, the demand for long-term durability and stability of the UV source is paramount for around-the-clock operation. Unfortunately, currently available lasers that emit DUV suffer from degradation, frequent refurbishment, and time-consuming alignment issues that cannot be tolerated when installed in machinery. The primary point of failure for these systems is centered at the delicate NLO FC devices currently available.

The present invention relates generally to certain compounds having advantageous optical and physical properties. More specifically, the invention relates to compounds represented by $RAl_3B_4O_{12}$, where R is comprised of one or a plurality of the elements {Sc, La, Y, Lu}, and possesses the ability to operate as a frequency converter below 350 nm. More specifically, as an example, the invention provides a specific compound comprising $M_{(1-x)}M'_xAl_3B_4O_{12}$ for use in the generation of selected wavelengths of electromagnetic radiation. x is larger than or equal to zero and smaller than or equal to 0.4, and M and M' are elements selected from a group consisting of Sc, Y, La, and Lu. These new UV-grade huntite-type aluminum double borate materials are referred herein as the preferred materials. More particularly, an object of certain embodiments of the present invention utilizes constituents of the preferred materials that satisfy $Y_{(1-x)}M'_xAl_3B_4O_{12}$, where M'=Sc, La, or Lu, and $0 \leq x \leq 0.4$, and are manufactured by a method that eliminates or significantly reduces contaminants that prohibit effective use of the device in the UV spectrum. Even more specifically, some embodiments of the present invention substantially exclude transition metals from being present in the material so as to be useful in the UV below 350 nm. The preferred materials are key components in the reliable generation of UV QCW or pulsed laser radiation by the laser apparatus, and as such, the invention is specifically designed to take advantage of their intrinsic optical, thermal, and other physical properties.

Embodiments of the present invention relate to an ultraviolet laser apparatus that includes one or more source lasers and one or more FC devices, where at least one such FC device is fabricated from a compositional member of the preferred materials; these constituents combine to operate as a system so as to produce QCW or pulsed UV light of 190-350 nm. In a first embodiment, the pulses from the source laser(s) have pulse durations between 1 ps and 300 ps, and the repetition rate is high enough (10 MHz to 1 GHz) to allow the output of the laser apparatus to be effectively continuous wave for a number of applications. In many instances these pulses are stretched by applying a linear chirp, the lengthened pulses are then intensified in preamplification and power amplification stages, and then compressed back down into in the low picosecond regime. This serves to increase the pulse peak power while maintaining QCW pulse repetition rates, so as to generate sufficient peak power to drive subsequent FC devices efficiently.

In a second embodiment, a coherent pulsed UV light source with wavelengths that range between 190 and 350 nm is provided. The beam is made up of pulses of durations lying between 300 ps and 100 ns, having a pulse repetition rate of 100 kHz to 5 MHz. This pulsed laser design is comparable in average power to the QCW laser architecture, with the tradeoff being lower repetition rates for longer pulse durations.

In a third embodiment, for generation of higher pulse energies in pulses with durations of 1 ns to 1 μs, a specialized master-oscillator-power-amplifier source laser architecture is provided with a mode-locked seed laser and a uniform pulse rate that can be modulated to produce gated packets of pulses that are later amplified in a highly-saturated laser amplifier. By creating pulse packets that contain a plurality of shorter pulses, the laser design reduces the duty cycle over a non-modulated design, thereby boosting the pulse peak power and efficiency in subsequent FC stages.

Pulse packet repetition rates are typically 100 kHz to 100 MHz with intra-packet oscillator pulses of 10 MHz to 1 GHz. The source laser(s) used in the laser apparatus are designed to achieve peak powers typically greater than those used in frequency-converted lasers of prior art. When such a packeted pulse laser design is coupled with a UV FC stage that contains an NLO device made from the preferred materials, the overall high intensity UV laser system makes good use of a UV FC crystal with a high damage threshold and high resistance to optical degradation. Pulsed UV light of 190-350 nm is generated with relatively high powers.

The design of the laser apparatus described herein employs FC techniques to produce UV light as an integer multiple of the input fundamental laser frequencies. Multiple laser sources may be mixed within the FC device, but the most commonplace usage is a single laser for one fundamental optical frequency source. SHG is the most customary conversion scheme, but SFM is also a common alternative. For example, some embodiments described herein use SHG to convert green laser light to 266 nm and SFM of 1030 nm and 257 nm to produce 206 nm light. The FC techniques employ different frequencies that are doubled and/or summed to produce a beam at the target frequency. Thus, although the embodiments herein may utilize one or more source lasers, the most commonplace usage is one source laser.

The use of laser sources with greater peak powers, uniquely allowed by the characteristic high optical durability of the preferred materials, in turn facilitates shorter NLO device lengths than are typically used in frequency-converted lasers of prior art—less propagation length is needed to achieve a given conversion efficiency as the peak power is increased. For a single-crystal NLO device, the ability to use a shorter crystal has a number of very significant advantages related to phase matching. By decreasing the crystal length to less than 4 mm (e.g., 1-3 mm), the FC process possesses a greater spectral acceptance bandwidth, a greater thermal acceptance bandwidth, and a greater angular acceptance bandwidth. A greater spectral acceptance bandwidth expands the range of candidate source laser designs because it allows the input light to have a broader spectral linewidth. Also, a greater thermal acceptance bandwidth reduces the sensitivity of phase-matching to longitudinal and transverse thermal gradients that are produced by absorption of light, typically at the generated wavelength. Linear losses and two-photon absorption losses are reduced when shorter crystals are used. In addition to the sensitivity of thermal gradients being reduced for shorter crystals, the temperature range itself inside the crystal is expected to be less for shorter crystals. Thus, the problem of thermal dephasing is greatly reduced in the current invention. Thermal control to maintain a given average crystal temperature may be optional in preferred material crystals of length 4 mm or less. Another significant advantage of using shorter crystals is that the lateral beam walk-off due to birefringence is reduced. Walk-off reduces FC efficiency and significantly distorts (elongates) the transverse profile of the generated beam.

The preferred materials are substantially hard and easily accept a fine optical polish. Optical coatings such as AR-coatings can be applied to the preferred materials without difficulty. However, when operating at high intensities for optimal NLO performance, no known optical coating can endure as great or have as long a lifetime as compared with a finely-polished surface of the preferred material. The fabrication of input and/or output faces at the appropriate Brewster's angle can reduce surface reflection losses, although uncoated, normal-incidence faces may be preferred for very high intensities.

In addition to supporting crystals having shorter lengths than typical crystals, the preferred materials allow a significant simplification in the mechanical design of the laser apparatus: the omission of an environmental isolation chamber surrounding the material. Purged or sealed environmental chambers are typically necessary in UV lasers that employ CLBO or BBO primarily because of the hygroscopic nature. In contrast, the preferred materials remain insensitive to the presence of water. As such, water-based optical degradation for these materials has not been shown to be evident, and as such, their non-hygroscopic nature directly imparts operational longevity as a constituent of the laser apparatus. The preferred materials demonstrate the lack of moisture uptake, and under uncontrolled ambient conditions, they demonstrated no long-term degradation. By way of comparison, prior art materials BBO and CLBO are notorious for breakdown over time as a result of their reactivity with water vapor.

FIG. 1 shows typical long term behavior of 266 nm generated radiation from UV-grade huntite, BBO, and CLBO crystalline devices. Mere ambient atmospheric moisture is sufficient to cause degradation of the commercial UV NLO materials in a matter of minutes of operation. This situation is of grave consequence for the use of BBO and CLBO FC devices in lasers, where the laser apparatus suffers diminished operational longevity and requires momentous design complexity/compromise to manage FC crystal issues. The lack of the need for environmental isolation results in a very significant reduction in the complexity, cost, and required maintenance of the FC laser apparatus and represents an overall improvement to the design and operation of the laser apparatus.

Embodiments of the present invention benefit from another feature of the NLO devices made from the preferred materials, sans UV-inhibiting contaminants: the functional improvement of optical transmission in the UV. Contaminants that contribute to transmission loss cause localized heat generation and thermal de-phasing in the NLO device. While the primary effort by the invention is directed toward the reduction of absorptive moieties (e.g. transition metal atoms) within NLO devices, a novel component incorporated in the invention reduces the longitudinal thermal gradient and guards against significant thermal dephasing. Described herein is a novel type of thermal contacting of the NLO component whereby the NLO device is mounted by melting a metal form around its exterior and holding it in a thermally-conductive support. A subsequent procedure to remove fluxing (wetting) agents used in soldering is performed by washing them away with water or a solvent. The longitudinal temperature gradients caused by absorption, which in turn locally impair the quality of phase-matching of focused light beams, are thereby reduced in this mount. As a result of the novel mounting scheme, FC efficiency is improved by reducing thermal dephasing through control of the thermal environs of the crystal: the intimate metalized contact of the NLO device reduces temperature gradients in the device, caused by residual intrinsic optical absorption.

A particular dimension of the invention is described by the unique configuration of optical intensity within a frequency converting device. The preferred material allows access to design parameter space heretofore unattainable for high-performance commercial laser systems: high peak power pulses combined with tightly-focused beam waists to produce a very high intensity within the NLO material for high conversion efficiency; shorter crystals to improve spectral, thermal, and angular acceptance for phase-matching, and to reduce walk-off distortion, and absorptive losses; and environmental and mechanical robustness that relaxes the conventional need to delicately manage the crystal and it surroundings. All these attributes combine to define other aspects to the current laser apparatus invention: one of the NLO devices used to produce UV light will have an operating local pulse peak intensity exceeding 5 GW/cm$^2$. Another element of the current invention: one of the NLO devices used to produce UV light will have an operating local time-averaged intensity exceeding 50 MW/cm$^2$.

In yet another aspect of the invention, considerations for the NLO device design include methods commonly known in the art and may be applied to NLO device(s) manufactured from the preferred material in the frequency converted laser apparatus. The NLO device material(s), size, orientation, and face angles are specified. The desired polarization and transverse field profiles of the input light are specified, along with (a) Type I or Type II conversion methods, (b) critically, non-critically, or quasi-phase-matching methods, (c) input/output faces normal to the incident light, (d) Brewster's angle or any other non-normal angle input and/or output faces, and/or (e) composite monolithic structures.

Embodiments of the present invention include the use of any and all techniques of NLO component design known in the art being applied to the preferred materials described herein. Additionally, the use of the techniques described herein as applied to other nonlinear materials may be used in the current invention to implement the FC processes, if any, which do not involve the preferred materials.

It is an object of some embodiments of the present invention to provide methods for making nonlinear optical materials that satisfy the above composition without the deleterious UV absorption. One embodiment comprises forming a mixture comprising from about 10 to about 30 mol % of a source of Y, from about 10 to about 40 mol % of M, from about 15 to about 40 mol % of a source of Al, and from about 25 to about 50 mol % of boron oxide. If M is Sc, then the source of M generally is scandium oxide; if M is La, then the source of M generally is lanthanum oxide; if M is Lu, then the source of M generally is lutetium oxide. The mixture is heated to a temperature and for a period of time sufficient to form the NLO material. For instance, the step of heating may comprise heating the mixture to a first temperature of at least 850 K, and generally greater than about 850 K. The mixture is then cooled. After cooling the mixture is comminuted (ground to a fine powder, such as by grinding with a mortar and pestle), and then heated to a second temperature of at least 1300 K, generally greater than about 1300 K.

Figure 2:
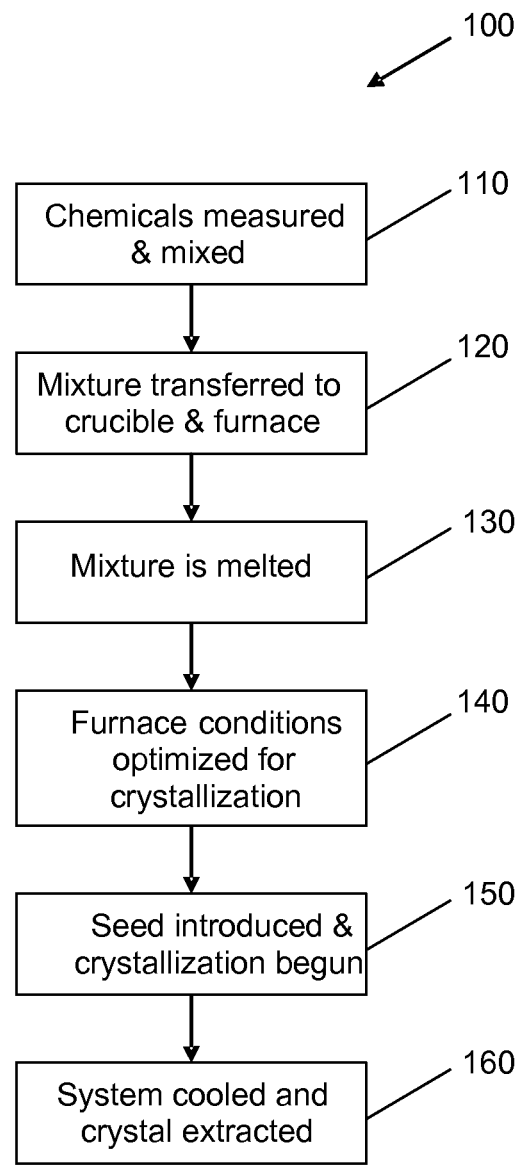
FIG. 2 represents a procedural method of making materials according to an embodiment of the present invention.

Another method to form these crystalline materials may be but not limited to top-seeded solution growth as shown in FIG. 2. The method includes the following processes:
1. High purity oxide powders and chemicals are measured and mixed in appropriate proportions.
2. The mixture is loaded in a crucible and placed in a furnace.
3. The mixture is heated and caused to melt into a liquid.
4. After a time, melt temperature is brought near to its freezing point.
5. A cold finger material or a seed crystal is introduced to initiate crystallization.
6. Melt temperature and apparatus conditions are modified and monitored to encourage crystal growth.
7. When appropriate, the system is brought down to room temperature.
8. The crystal is removed from the system.

For example, the synthesis of $(Y,La)Al_3B_4O_{12}$ may be performed as follows. Yttrium oxide $(Y_2O_3)$, having a purity of greater than 99.9%, lanthanum oxide $(La_2O_3)$, having a purity of greater than 99.9%, aluminum oxide $(Al_2O_3)$, having a purity greater than 99.9%, and boron oxide $(B_2O_3)$, having a purity of greater than 99.9% were purchased from commercial vendors such as Aesar and Stanford Materials. A mixture was formed including about 14 wt % yttrium oxide, about 30 wt % lanthanum oxide, about 19 wt % aluminum oxide, and about 37 wt % boron oxide.

As discussed herein, certain embodiments of the present invention are related to nonlinear optical (NLO) devices and electro-optic devices and the ability to employ such devices below 350 nm. Some embodiments of the present invention are related to nonlinear optical materials that satisfy the general formula $Y_{(1-x)}M'_xAl_3B_4O_{12}$ (M'=Sc, La, or Lu and 0≤x≤0.4) and are prepared without contaminants that prevent use in the ultraviolet (UV) section of the electromagnetic spectrum. In another embodiment, the nonlinear optical materials satisfy the general formula $Lu_{(1-x)}M'_xAl_3B_4O_{12}$ (M'=Sc, y, or La and 0≤x≤0.4) and are prepared without contaminants that prevent use in the ultraviolet (UV) section of the electromagnetic spectrum.

According to some embodiments of the present invention, the nonlinear optical material $Y_{(1-x)}M'_xAl_3B_4O_{12}$ (M'=Sc, La, or Lu, and 0≤x≤0.4) is used for an NLO device for operation below 350 nm. In another example, the nonlinear optical material is used with a laser source for a device that generates optical radiation below 350 nm. In yet another example, the nonlinear optical material is used with a light source for a device that generates optical radiation below 350 nm. In yet another example, the nonlinear optical material is formed in the trigonal crystal class for use below 350 nm. In yet another example, the nonlinear optical material is formed in the space group R32 for use below 350 nm.

In certain embodiments of the present invention, the nonlinear optical material satisfies $Sc_{(1-x)}M'_xAl_3B_4O_{12}$ (M'=Y, La, or Lu, and 0≤x≤0.4) or $Lu_{(1-x)}M'_xAl_3B_4O_{12}$ (M'=Sc, La, or Lu, and 0≤x≤0.4).

The pure form of $YAl_3B_4O_{12}$ (YAB) has not been commercially produced. Conventional laboratory methods of growth yield small crystals that contain a significant amount of non-stoichiometric metals contamination and exhibits substandard crystal quality. Moreover, the solvent used introduces a considerable amount of contaminant that prevents device operation in the UV below 350 nm. Some work on huntite double borates describes a flux system that has remained the primary method of producing YAB and its family members, namely the potassium molybdates $K_2MoO_4$ and $K_2Mo_3O_{10}$. Unfortunately, these solvent formulations possess severe limitations for large scale crystal growth: a) high flux volatility, b) small crystal yield, and c) significant inclusion of Mo atoms into the target borate huntite structure. Thus, neither commercial crystal production of pure YAB has come about nor has YAB been adopted into laser products as a dedicated frequency converter.

It is an object of certain embodiments of the present invention to produce and utilize nonlinear optical materials that satisfy a familial class designated huntite-type aluminum double borates, having a composition given by $RAl_3B_4O_{12}$ where R is comprised of one or a plurality of the elements {Sc, La, Y, Lu}. The preferred materials crystallize in the primitive rhombohedral class and of space group R32, isostructural to the mineral, huntite. In the formula listed above, the symbol R is intended to represent atoms of one or more elements of the listed group to occupy the same lattice site in the huntite crystal structure, namely Wyckoff site notation 3a. Similarly, Al atoms generally occupy Wyckoff site 9d in the huntite structure. Thus, in an embodiment, R is {Y, La, Lu}, providing a huntite-type aluminum double borate crystal with elements {Y, La, Lu} sharing occupancy on 3a with a molar sum of one. More particularly, $M_{(1-x)}M'_xAl_3B_4O_{12}$ where 0≤x≤0.4, M and M'=(one or more of Sc, Y, La, or Lu). In this second formula, the symbols and M and M' are intended to represent atoms occupying the lattice site 3a, and Al atoms occupy Wyckoff site 9d in the huntite structure. Thus, in an embodiment, M is Y and M' is La, providing an aluminum double borate crystal with up to 40% La substituted for Y. Thus, in the lists of elements provided throughout the present specification, although some embodiments utilize only two of the varied elements in the crystal composition, this is not required by other embodiments of the present invention.

More specifically, some embodiments of the present invention substantially exclude metals, such as those of Group 6, from being present in the device so as to be useful in the UV below 350 nm. Avoiding the inclusion of Group 6 impurities, such as Mo, extends the UV transmission of select borate huntites. In addition, the absence of superfluous metals in the primary crystal composition reduces the overall bulk spectral absorption over its entire transparency range, such as from 165 to 2700 nm. With the embodiments described herein, the intrinsic UV transparency may be uniquely realized compared to methods described in prior art.

As discussed herein, it is an object of some embodiments of the present invention to provide methods for making nonlinear optical materials that satisfy $M_{(1-x)}M'_xAl_3B_4O_{12}$ where 0≤x≤0.4, M and M'=(Sc, Y, La, Lu) without the deleterious UV absorption. One embodiment comprises forming a mixture comprising from about 10 to about 30 mol % of a source of M, from about 10 to about 40 mol % of M', from about 15 to about 40 mol % of a source of Al, and from about 25 to about 50 mol % of boron oxide. If M or M' is Sc, the source of M or M' generally is scandium oxide; if M or M' is Y, then the source of M or M' generally is yttrium oxide; if M or M' is La, then the source of M or M' generally is lanthanum oxide; if M or M' is Lu, then the source of M or M' generally is lutetium oxide. The mixture is heated to a temperature and for a period of time sufficient to form the NLO material. For instance, the step of heating may comprise heating the mixture to a first temperature of at least 850 K, and generally greater than about 850 K. The mixture is then cooled. After cooling the mixture is comminuted (ground to a fine powder, such as by grinding with a mortar and pestle), and then heated to a second temperature of at least 1300 K, generally greater than about 1300 K.

FIG. 2 is a simplified method for making optical compound according to an embodiment of the present invention. This diagram is merely an example, which should not unduly limit the scope of the claims. One of ordinary skill in the art would recognize many variations, alternatives, and modifications. The method 100 includes a process 110 for measuring and mixing chemicals, a process 120 for transferring mixture to crucible and furnace, a process 130 for melting mixture, a process 140 optimizing furnace conditions for crystallization, a process 150 for introducing seed and starting crystallization, and a process 160 for cooling system and extracting crystal. Although this method of making has been shown using a selected sequence of processes, there can be many alternatives, modifications, and variations. For example, some of the processes may be expanded and/or combined. Other processes may be inserted to those noted. Depending upon the embodiment, the specific sequence of processes may be interchanged with others replaced. For example, the process 150 is modified to use spontaneous nucleation, or use conventional optical crystal growth procedures to introduce a cold finger to the melt surface. Further details of these processes are found throughout the present specification and more particularly below.

At the process 110, certain chemicals are measured and mixed. For example, high purity oxide powders and chemicals are measured and mixed in appropriate proportions. At the process 120, the mixture is transferred to crucible and furnace. For example, the mixture is loaded in a crucible (e.g., a platinum group metal crucible) and placed in a furnace. At the process 130, the mixture is melted. For example, the mixture is heated and caused to melt into a liquid.

At the process 140, furnace conditions are optimized for crystallization. For example, after a time, the melt temperature is brought near to its freezing point. At the process 150, a seed is introduced and the crystallization is started. For example, a seed crystal is introduced to initiate crystallization. In another example, the process 150 is modified to use a cold finger material to initiate crystallization. In yet another example, the process 150 is modified to use spontaneous nucleation to initiate crystallization. Additionally, the melt temperature and apparatus conditions are modified and monitored to encourage crystal growth. At the process 160, the system is cooled and the crystal is extracted. For example, when appropriate, the system is brought down to room temperature. The crystal is removed from the system and ready for tests or further processing.

As an example for the method 100, the synthesis of $Y_{(1-x)}La_xAl_3B_4O_{12}$ ($0 \leq x \leq 0.4$, for example, $x \approx 0.25$) is performed as follows: At the process 110, yttrium oxide ($Y_2O_3$), having a purity of greater than 99.9%, lanthanum oxide ($La_2O_3$), having a purity of greater than 99.9%, aluminum oxide ($Al_2O_3$), having a purity greater than 99.9%, and boron oxide ($B_2O_3$), having a purity of greater than 99.9% are obtained. For example, these chemicals are acquired from commercial vendors such as Aesar and Stanford Materials. A mixture is formed including about 14 wt % $Y_2O_3$, about 30 wt % $La_2O_3$, about 19 wt % $Al_2O_3$, and about 37 wt % $B_2O_3$.

At the process 120, the mixture is loaded into a crucible and placed in a high-temperature furnace with atmospheric environment control. For example, either ambient or an inert atmosphere is satisfactory. At the process 130, the mixture is heated in 12 hours from room temperature to another temperature ranging from 1450 to 1575 K. The resulting melt is allowed to soak at another temperature for about 1 to 3 days.

At the process 140, the liquid mixture is cooled at a rate of 20 K/hour to a temperature near its freezing point. For example, the temperature ranges from about 1475 to 1400 K. At the temperature, the mixture is held for about 8 hours. At the process 150, by spontaneous nucleation, or by using conventional optical crystal growth procedures to introduce a crystalline seed or cold finger to the melt surface, the product begins to form while cooling to a final temperature of 1300 K at a rate of about 1-5 K/day. Additionally, during the course of the growth, the melt temperature and apparatus conditions are monitored and optionally modified to encourage crystal growth, either by an operator and/or by the automated control system on the furnace.

At the process 160, the system is then cooled to room temperature at a cooling rate of about 50 K/hour. Colorless, transparent crystal of $Y_{(1-x)}La_xAl_3B_4O_{12}$, where $0 \leq x \leq 0.4$, is obtained and removed from the furnace.

In yet another example for the method 100, the synthesis of $Lu_{(1-x)}La_xAl_3B_4O_{12}$, where $0 \leq x \leq 0.4$, is performed as follows: At the process 110, lutetium oxide ($Lu_2O_3$), having a purity of greater than 99.9%, lanthanum oxide ($La_2O_3$), having a purity of greater than 99.9%, aluminum oxide ($Al_2O_3$), having a purity greater than 99.9%, and boron oxide ($B_2O_3$), having a purity of greater than 99.9% are obtained. For example, these chemicals are acquired from commercial vendors such as Aesar and Stanford Materials. A mixture is formed including about 21 wt % $Lu_2O_3$, about 30 wt % $La_2O_3$, about 16 wt % $Al_2O_3$, and about 34 wt % $B_2O_3$.

At the process 120, the mixture is loaded into a crucible and placed in a high-temperature furnace with atmospheric environment control of nitrogen with a partial pressure of oxygen, which is less than or equal to about 3000 ppm. At the process 130, the mixture is heated in 12 hours from room temperature to another temperature ranging from 1450 to 1575 K. The resulting melt is allowed to soak at another temperature for about 1 to 3 days.

At the process 140, the liquid mixture is cooled at a rate of 20 K/hour to a temperature near its freezing point. For example, the temperature ranges from about 1475 to 1400 K. At the temperature, the mixture is held for about 8 hours. At the process 150, by spontaneous nucleation, or by using conventional optical crystal growth procedures to introduce a crystalline seed or cold finger to the melt surface, the product begins to form while cooling to a final temperature of 1275 K at a rate of about 1-5 K/day. Additionally, during the course of the growth, the melt temperature and apparatus conditions are monitored and optionally modified to encourage crystal growth, either by an operator and/or by the automated control system on the furnace.

At the process 160, the system is then cooled to room temperature at a cooling rate of about 50 K/hour. Colorless, transparent crystal of $Lu_{(1-x)}La_xAl_3B_4O_{12}$, where $0 \leq x \leq 0.4$, for example, $x \approx 0.2$, is obtained and removed from the furnace.

In yet another example for the method 100, the synthesis of $Sc_{(1-x)}La_xAl_3B_4O_{12}$, where $0 \leq x \leq 0.4$, is performed as follows: At the process 110, scandium oxide ($Sc_2O_3$), having a purity of greater than 99.9%, lanthanum oxide ($La_2O_3$), having a purity of greater than 99.9%, aluminum oxide ($Al_2O_3$), having a purity greater than 99.9%, and boron oxide ($B_2O_3$), having a purity of greater than 99.9% are obtained. For example, these chemicals are acquired from commercial vendors such as Aesar or Stanford Materials. A mixture is formed including about 8 wt % $Sc_2O_3$, about 34 wt % $La_2O_3$, about 18 wt % $Al_2O_3$, and about 39 wt % $B_2O_3$.

At the process 120, the mixture is loaded into a crucible and placed in a high-temperature furnace with atmospheric environment control. For example, either ambient or a nitrogen atmosphere is satisfactory. At the process 130, the mixture is heated in 12 hours from room temperature to another temperature ranging from 1475 to 1600 K. The resulting melt is allowed to soak at temperature for about 1 to 3 days.

At the process 140, the liquid mixture is cooled at a rate of 20 K/hour to a temperature near its freezing point. For example, the temperature ranges from about 1500 to 1425 K. At the temperature, the mixture is held for about 8 hours. At the process 150, by spontaneous nucleation, or by using conventional optical crystal growth procedures to introduce a crystalline seed or cold finger to the melt surface, the product begins to form while cooling to a final temperature of 1300 K at a rate of about 1-5 K/day. Additionally, during the course of the growth, the melt temperature and apparatus conditions are monitored and optionally modified to encourage crystal growth, either by an operator and/or by the automated control system on the furnace.

At the process 160, the system is then cooled to room temperature at a cooling rate of about 50 K/hour. Colorless, transparent crystal of $Sc_{(1-x)}La_xAl_3B_4O_{12}$, where $0 \leq x \leq 0.4$, is obtained and removed from the furnace.

Figure 3:
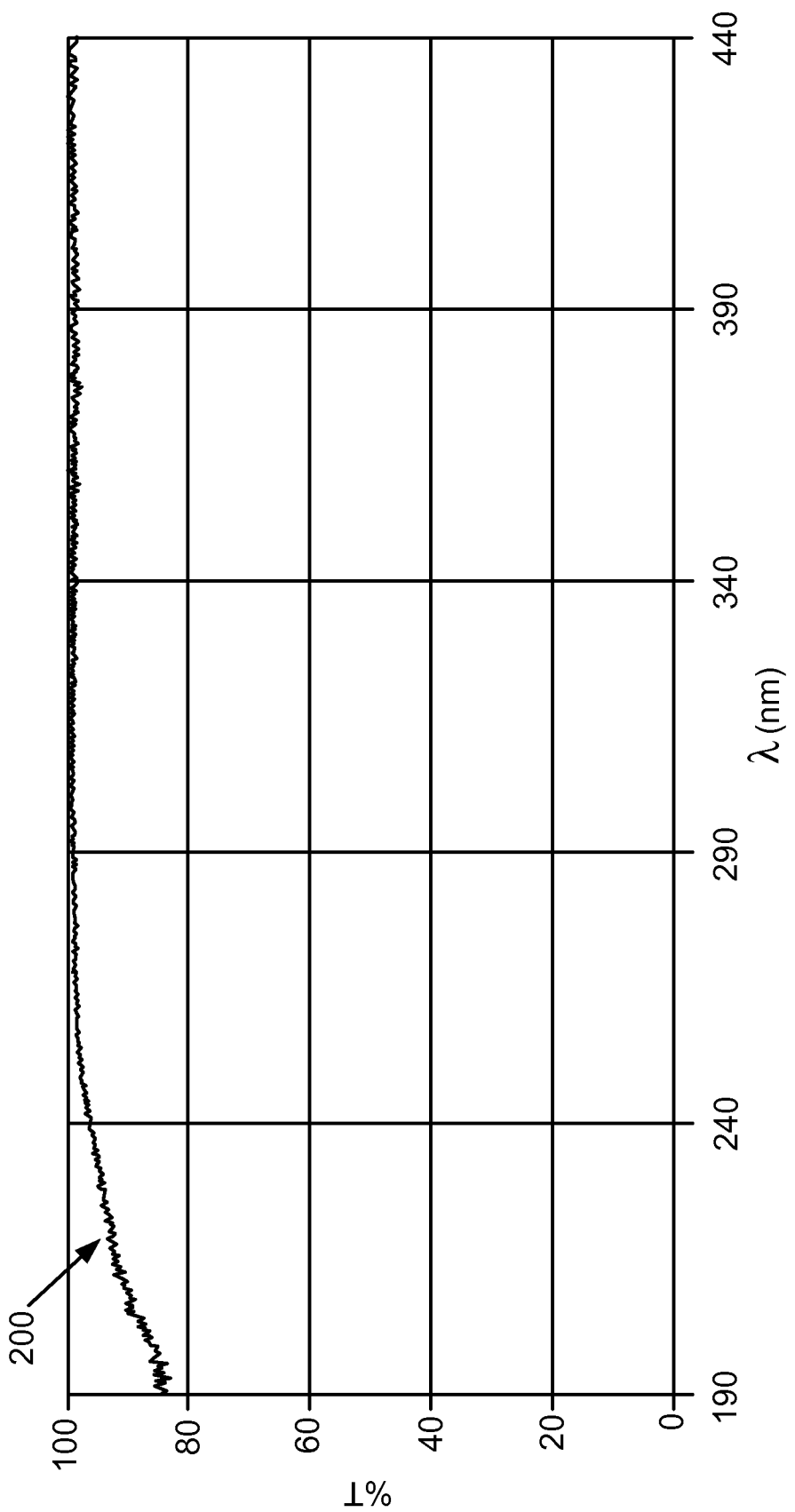
FIG. 3 is a simplified diagram showing optical transmission characteristics for an optical compound representative of materials provided according to an embodiment of the present invention.

FIG. 3 is a simplified diagram showing transmission characteristics for an optical compound according to an embodiment of the present invention. This diagram is merely an example, which should not unduly limit the scope of the claims. One of ordinary skill in the art would recognize many variations, alternatives, and modifications. The optical compound includes $Y_{(1-x)}La_xAl_3B_4O_{12}$, where $0 \leq x \leq 0.4$, made by the method 100 as discussed. The synthesis starts with yttrium oxide ($Y_2O_3$), lanthanum oxide ($La_2O_3$), aluminum oxide ($Al_2O_3$), and boron oxide ($B_2O_3$). As shown in FIG. 3, a curve 200 shows the transmission percentage as a function of wavelength. Over this spectral range (without benefit of vacuum UV data), the Fresnel losses were offset in the data, and the intrinsic absorption edge is not observed. Surface and bulk scattering losses become more apparent in the DUV, along with any residual bulk absorption. Thus, the measured optical transmission data from 190 nm to 350 nm demonstrates DUV transparency well above 75%.

As discussed herein, and further emphasized here, the method can be used to make various types of optical compounds. According to one embodiment of the present invention, a compound for nonlinear optics for use at 350 nm and below is made by the method 100. The compound includes a material for nonlinear optics comprising $YAl_3B_4O_{12}$. The compound is free from a molybdenum bearing impurity of at least 1000 (e.g., 500) parts per million.

According to yet another embodiment of the present invention, a compound for nonlinear optics for use at 350 nm and below is made by the method 100. The compound comprising a material for nonlinear optics includes $Y_{(1-x)}M'_xAl_3B_4O_{12}$. x is larger than or equal to zero and smaller than or equal to 0.4, and M' is selected from a group consisting of Sc, La, and Lu. The compound is free from a molybdenum bearing impurity of at least 1000 parts per million.

According to yet another embodiment of the present invention, a compound for nonlinear optics for use at 350 nm and below is made by the method 100. The compound comprising a material for nonlinear optics includes $Lu_{(1-x)}M'_xAl_3B_4O_{12}$. x is larger than or equal to zero and smaller than or equal to 0.4, and M' is selected from a group consisting of Sc, Y, and La. The compound is free from a molybdenum bearing impurity of at least 1000 parts per million.

According to yet another embodiment of the present invention, a compound for nonlinear optics for use at 350 nm and below comprising a material for nonlinear optics includes $Sc_{(1-x)}M'_xAl_3B_4O_{12}$. x is larger than or equal to zero and smaller than or equal to 0.4, and M' is selected from a group consisting of Y, La, and Lu. The compound is free from a molybdenum bearing impurity of at least 1000 parts per million.

According to yet another embodiment of the present invention, a compound for nonlinear optics for use at 350 nm and below is made by the method 100. The compound comprising a material for nonlinear includes $M_{(1-x)}M'_xAl_3B_4O_{12}$. x is larger than or equal to zero and smaller than or equal to 0.4, M and M' are selected from a group consisting of Sc, Y, La, and Lu. The compound is free from a molybdenum bearing impurity of at least 1000 parts per million. In one embodiment, M includes at least one selected from a group consisting of Sc, Y, La, and Lu. In another embodiment, M' includes at least one selected from a group consisting of Sc, Y, La, and Lu.

As discussed herein, according to certain embodiments, each of various types of optical compounds made by the method 100 is free from a molybdenum bearing impurity of at least 1000 parts per million. For example, the compound is free from a molybdenum bearing impurity of at least 500 parts per million. In another example, the compound is free from a molybdenum bearing impurity of at least 100 parts per million. In yet another example, the compound is free from a molybdenum bearing impurity of at least 10 parts per million. In yet another example, the compound is free from a molybdenum bearing impurity of at least 1 part per million. In yet another example, the compound is substantially free from a molybdenum bearing impurity.

According to some embodiments of the present invention, each of various types of optical compounds made by the method 100 each is free from any impurity of at least 1000 parts per million that can prevent the compound from being used for nonlinear optics at 350 nm and below. For example, the compound is free from any such impurity of at least 500 parts per million. In another example, the compound is free from any such impurity of at least 100 parts per million. In yet another example, the compound is free from any such impurity of at least 10 parts per million. In yet another example, the compound is free from any such impurity of at least 1 part per million. In yet another example, the compound is substantially free from any such impurity.

As discussed herein, according to certain embodiments, each of various types of optical compounds made by the method 100 has a volume greater than about 0.001 $mm^3$. For example, the compound has a volume greater than about 0.01 $mm^3$. In another example, the compound has a volume greater than about 0.1 $mm^3$. In yet another example, the compound has a volume greater than about 1 $mm^3$.

According to some embodiments, various types of optical compounds made by the method 100 can be used for nonlinear optics at 350 nm and below. For example, the use is associated with a wavelength ranging from about 350 nanometers to 190 nm. In another example, the use is associated with a wavelength ranging from about 350 nm to 170 nm. In yet another example, the use is associated with a device that generates optical radiation below 350 nm. In yet another example, the device comprises an NLO system, the compound associated with a laser system, and/or the compound associated with a light source.

According to certain embodiments, the method 100 can be used to make a compound for nonlinear optics for use at 350 nm and below. For example, the compound is associated with the trigonal crystal class for use below 350 nm, and/or the space group R32 for use below 350 nm.

According to yet another embodiment of the present invention, a method for making a compound for nonlinear optics for use at 350 nm and below includes providing a plurality of materials. The plurality of materials includes a lanthanum bearing compound, and the lanthanum bearing compound is capable of being decomposed into at least lanthanum oxide upon heating. Additionally, the method includes mixing the plurality of materials to form a mixture based on at least information associated with a predetermined proportion, starting a crystallization process in the mixture to form a crystal, and removing the crystal from the mixture, the crystal including lanthanum. For example, the plurality of materials comprises lanthanum oxide. In another example, the plurality of material further comprises boron oxide. In yet another example, the method further includes placing the mixture into a furnace. In yet another example, the method further includes heating the mixture to a first predetermined temperature, and cooling the mixture to a second predetermined temperature. In yet another example, the starting a crystallization process comprises inserting a crystalline seed to a melt surface. In yet another example, the crystal includes $M_{(1-x)}M'_xAl_3B_4O_{12}$. x is larger than or equal to zero and smaller than or equal to 0.4, M and M' are selected from a group consisting of Sc, Y, La, and Lu. In yet another example, the method is implemented according to the method 100.

According to yet another embodiment of the present invention, a method for making a compound for nonlinear optics for use at 350 nm and below includes providing a plurality of materials. The plurality of materials includes an yttrium bearing compound, and the yttrium bearing compound is capable of being decomposed into at least yttrium oxide upon heating. Additionally, the method includes mixing the plurality of materials to form a mixture based on at least information associated with a predetermined proportion, starting a crystallization process in the mixture to form a crystal, and removing the crystal from the mixture, the crystal including yttrium. For example, the plurality of materials includes yttrium oxide. In another example, the plurality of material further includes boron oxide. In yet another example, the method further includes placing the mixture into a furnace. In yet another example, the method further includes heating the mixture to a first predetermined temperature, and cooling the mixture to a second predetermined temperature. In yet another example, the starting a crystallization process comprises inserting a crystalline seed to a melt surface. In yet another example, the crystal includes $M_{(1-x)}M'_xAl_3B_4O_{12}$. x is larger than or equal to zero and smaller than or equal to 0.4, M and M' are selected from a group consisting of Sc, Y, La, and Lu. In yet another example, the method is implemented according to the method 100.

The preferred materials are key components in the reliable generation of UV QCW or pulsed laser radiation by the laser apparatus, and as such, the invention is specifically designed to take advantage of their intrinsic optical properties. Three examples of frequency-converted laser apparatuses in this section will demonstrate the usefulness and practicality of the preferred materials in a system applicable to an industrial environment. The examples below are numerical models using data gathered from experiments on systems using $Y_{(1-x)}La_xAl_3B_4O_{12}$ where $0 \leq x \leq 0.4$. Measurements validated preconfigured theoretical models. The first example illustrates this new NLO material applied in a configuration that seizes the opportunity to use high optical intensities in a SHG frequency generation technique. The second example builds on the first example by illustrating the use of an additional SFG stage, putting the output further into the UV range. The third example uses a special hybrid mode-locked source with pulse compression to achieve excellent frequency conversion. For simplicity, the examples use free space optics and single crystal NLO components; designs that are readily chosen by those skilled in the art that use waveguide or fiber optics and/or more complicated NLO components are understood to also be embodiments of the current invention.

Figure 4:
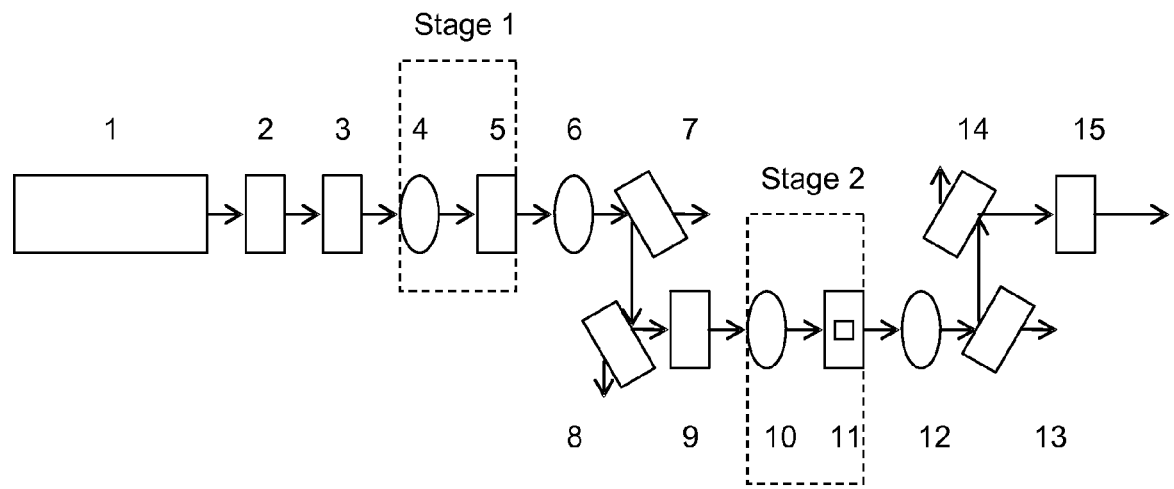
FIG. 4 represents an ultraviolet laser apparatus for fourth harmonic generation according to an embodiment of the present invention.

The laser system illustrated in FIG. 4 represents an ultraviolet laser apparatus for fourth harmonic generation. Laser source 1 has the following characteristics: 1064 nm fundamental wavelength, 30 W average power, 200 ps FWHM pulse duration, Gaussian pulse profile, 5 MHz repetition rate, 30 kW nominal peak power, nearly Gaussian beam output profile, and a vertical linearly polarized output. In a specific embodiment, the spectral linewidth is approximately 400 pm. In another embodiment, the pulse duration is less than 200 ps, for example, 10 ps. Additionally, in yet another embodiment, the pulse repetition rate is higher, for example, 100 MHz.

The beam passes through an optical window 2 to an optional 1064 nm half-wave plate 3 that rotates the polarization. The surfaces of elements 2 and 3 are AR-coated, as are all other surfaces unless otherwise specified. A system of one or more lenses 4 couples the beam into a 20 mm long AR-coated LBO crystal 5 for Type I, non-critically phase-matched SHG. The LBO crystal is partially enclosed in an oven which maintains the crystal at the phase-matching temperature, which is near 422 K. The beam is focused to waist of 70 μm inside the crystal 5, yielding a predicted conversion efficiency of approximately 63%. Loss for the fundamental beam is modeled with 99.5% transmission at each surface and with nine optical surfaces before the SHG process begins inside the LBO.

The generated beam of 532 nm wavelength then passes through a collimating lens system 6. Since no beam spatial walk-off is produced in non-critical phase-matching, the 532 nm beam has a nearly Gaussian profile. Harmonic separators 7 and 8 reflect the 532 nm light along the desired beam path and transmit the 1064 nm light, thus removing most of it from the beam. An optional 532 nm half-wave plate 9 orients the polarization while a lens 10 couples the light into an uncoated 3 mm crystal 11 of composition $(Y, La)Al_3B_4O_{12}$ for Type I critically phase-matched SHG, mounted in a thermally-molded metallic form for enhanced thermal contact and conduction under operational load, to be described in more detail hereafter. This apparatus may be used to finely tune phase-matching and/or reduce longitudinal temperature gradients, and/or decrease dephasing effects. The beam is focused to waist of 12 μm inside the crystal 11, yielding a peak intensity of 6.3 GW/cm², a time-averaged central beam intensity of 6.7 MW/cm², and a conversion efficiency of approximately 18%. Loss for the 532 nm beam is about 17%, assuming a 1% loss at each surface before to the crystal 11 surface, and an 8% loss at the latter surface.

The crystal is entered and excited by optical radiation at normal incidence and is not AR-coated because of coating damage considerations. The orientation of the beam in the crystal, relative to the axes on which the d tensor is constructed, is given by theta of about 66°, and phi of about 0°. The crystal in its special mount may be thermally controlled so as to finely tune phase-matching and/or reduce longitudinal temperature gradients and/or mitigate thermal dephasing. About 8% of the generated 266 nm is lost upon exiting the crystal. Ten more surfaces at 99% transmission are modeled for the laser output optics. A system of one or more lenses 12 corrects for beam spatial elongation due to walk-off and collimates the beam to the desired output diameter. Two harmonic separators 13 and 14 are used to separate 532 nm light out of the UV beam. An output window 15 completes the apparatus. This system will produce approximately 2.2 W of 266 nm laser light.

Figure 5:
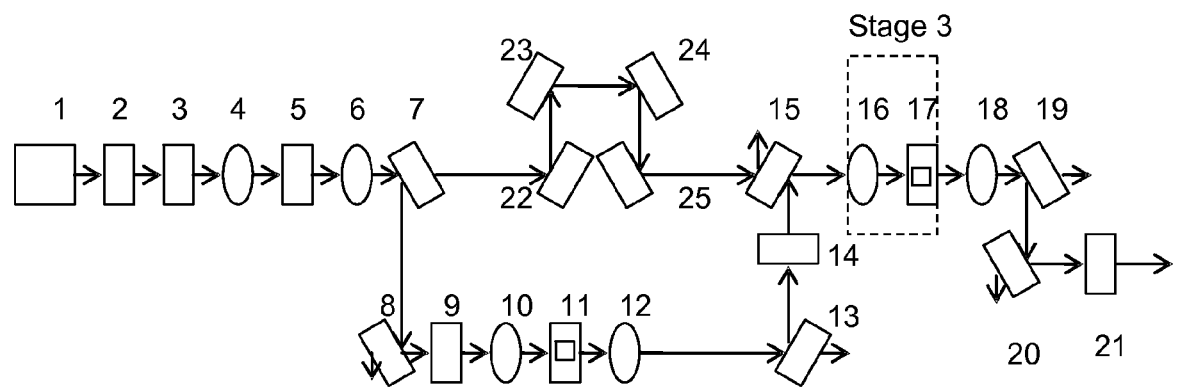
FIG. 5 represents an ultraviolet laser apparatus for fifth harmonic generation according to an embodiment of the present invention.

An alternative embodiment of the invention describes a laser system that generates the $5^{th}$ harmonic of the fundamental wavelength as illustrated in FIG. 5. The optical components 1 through 13 are similar to the forth harmonic embodiment and therefore are not discussed with respect to FIG. 5. The harmonic separator 15 transmits light at 1064 nm and 532 nm, and reflects light at 266 nm. Lens system 16 focuses the overlapping first and fourth harmonic beams into a 1 mm (Y, La)Al$_3$B$_4$O$_{12}$ crystal 17 for Type I critically phase-matched SFG, mounted in a thermally-molded metallic form for enhanced thermal contact and conduction under operational load, to be described in more detail hereafter. It is reasonable that 70% of the IR light that is unconverted in the first stage and over 50% of the 266 nm light generated in the second stage can be directed into concentric Gaussian beams inside the third conversion stage crystal. This $5^{th}$ harmonic crystal is entered and excited by optical radiation at normal incidence and is not AR-coated because of coating damage considerations.

The orientation of the beam in the crystal, relative to the axes on which the d tensor is constructed, is given by theta of about 73 degrees, and phi of about 0 degrees. The waists of both input beams in the crystal are 8 microns. The crystal may solder-mounted and thermally controlled in its novel FC support apparatus so as to finely tune phase-matching and/or reduce longitudinal temperature gradients, and/or decrease dephasing effects. A lens system 18 shapes and collimates the fifth harmonic beam. Harmonic reflectors, 19 and 20, reflect the lower wavelength and transmit the first and fourth harmonics. The beam exits through a window 21. This system produces about 100 mW of fifth harmonic (e.g. 213 nm) output power.

The four optical elements 22, 23, 24, and 25 are mirrors for the fundamental beam. Since the beam has a physical offset from stage two, a delay path is included to overlap the first and fourth harmonic laser beams.

Figure 6:
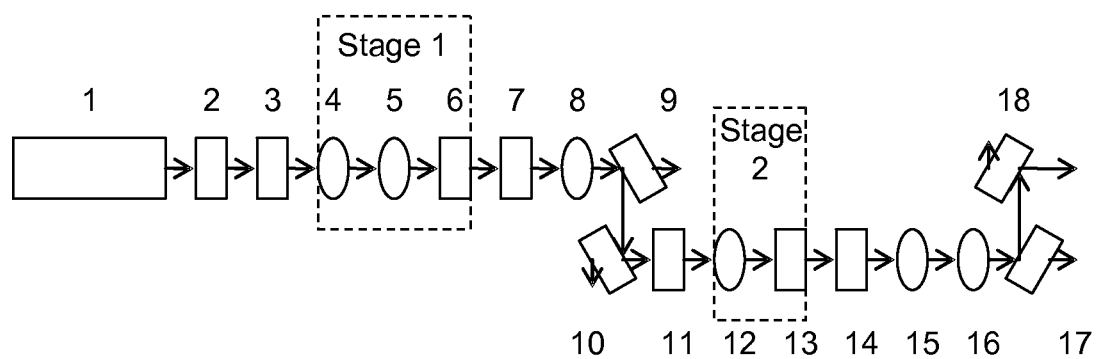
FIG. 6 represents an ultraviolet laser apparatus for producing 257 nm radiation according to an embodiment of the present invention.

In another embodiment of the current invention, a laser apparatus with two stages of FC is illustrated in FIG. 6. The specification for our pump source 1 is as follows: 1031 nm Q-switched DPSS crystal fiber laser; 40 kHz repetition rate; 14 ns temporal pulse width; about 30 W.

The laser beam from laser 1 propagates through an optical window 2 and zero order half-wave plate 3 wherein to enter the first FC stage. This stage consists of two cylindrical lenses 4 and 5 to account for elliptical or astigmatic beams and focuses into a 20 mm long LBO NLO device 6 that is configured for NCPM. The second harmonic produced at about 515 nm passes through a negative lens 7 and collimating lens 8. The collimated beam reflects off two harmonic separators 9 and 10 where less than 2% of the fundamental light is passed. The 515 nm beam continues through a 514 nm zero order half-wave plate 11 to rotate the polarization by 90 degrees. Stage 2 consists of a coupling lens 12 and a 4 mm long FC device comprising the preferred material (Y, La)Al$_3$B$_4$O$_{12}$ 13 for Type I critical phase-matching of 257 nm light; the crystal is solder-mounted into a thermally controlled apparatus to address the high optical intensity. The output optics consist a negative lens 14, two cylindrical lenses 15 and 16, for the same reasons as mentioned previously, and two harmonic separators 17 and 18. Accounting for all optics at 99% transmission per surface in the infrared and visible wavelengths, the generation of 515 nm is greater than 62% with a peak intensity of approximately 900 MW/cm$^2$. Optics in the UV are about 98% transmissive per surface. The 257 nm output of about 2.3 W has intensity at the waist of approximately 8 GW/cm$^2$, yielding 28% conversion efficiency.

Figure 9:
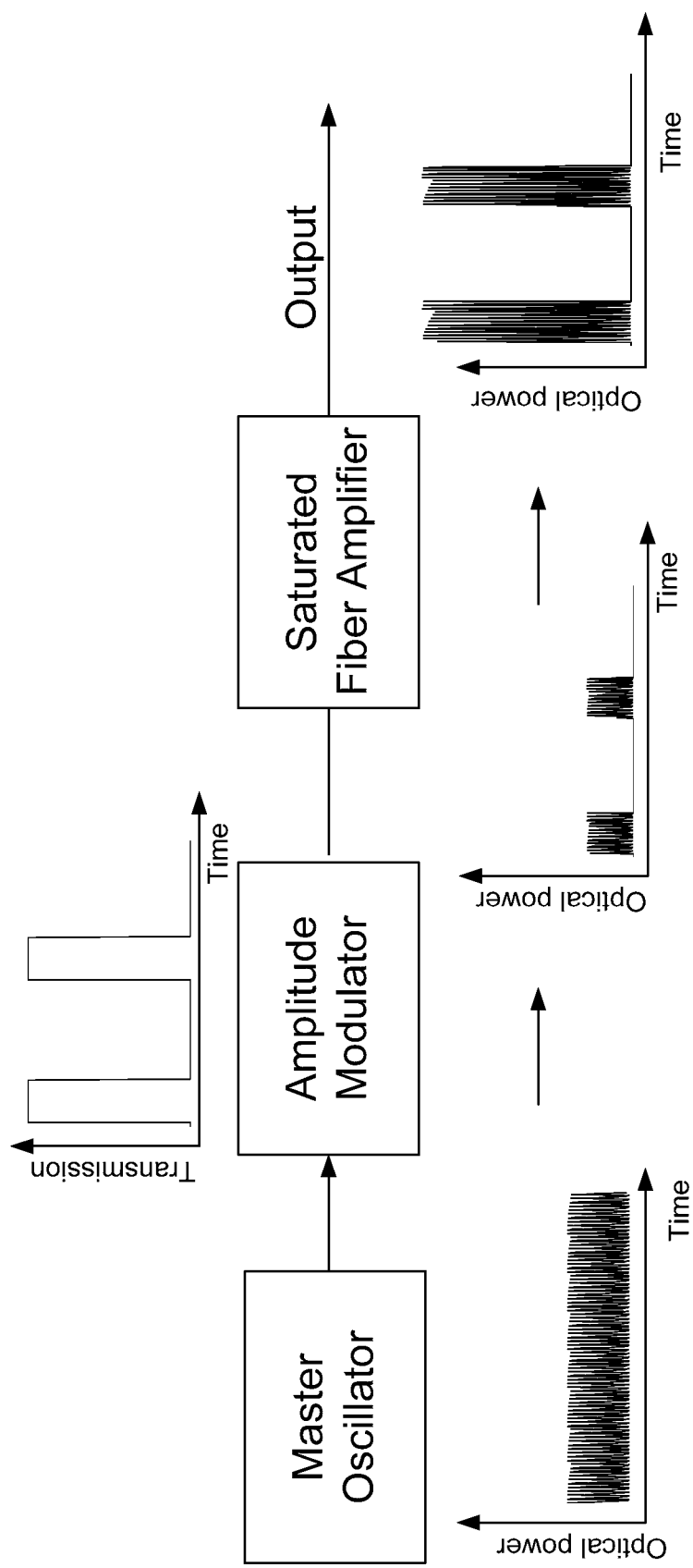
FIG. 9 is a schematic diagram illustrating the combination of a mode-locked laser source and an amplitude modulator according to an embodiment of the present invention.

In yet another embodiment of the invention, the apparatus uses a laser source that provides a packet of pulses. Such a source can be made placing a fiber-based electro-optic modulator (EOM) between a mode-locked fiber seed laser (150 ps chirped pulses at 100 MHz of 1064 nm light) and a fiber amplifier that operates in the saturated regime. The EOM passes 100 ns packets of these pulses to the amplifier with 900 ns between packets. If the EOM were not present, the output of the amplifier, which is maintained heavily-saturated, would have slightly greater average power but a significantly less pulse peak power—the most important factor for FC efficiency. The combination of a mode-locked laser source and an amplitude modulator is represented in the schematic of FIG. 9. With the placement of an amplitude modulator between the master oscillator and saturated fiber amplifier, groups of pulses can be asynchronously or synchronously gated, but very fast pulse selection (such as gating single oscillator pulses) is not compulsory. The overall desired effect of gating the mode-locked pulse train is to reduce the repetition rate of pulses directed into the gain-saturated optical amplifier so as to increase the amplified pulse energy and peak power. By way of example, the amplitude modulator may gate packets of oscillator pulses with about a 10% duty cycle. The output of the saturated amplifier will still deliver the same average power, but its peak power increases by about a factor of 10 as compared to a non-gated laser.

The short pulses are then compressed 15 times in a grating-based pulse compressor. The resulting periodic unit of the wave-train consists of a packet of ten 10 ps pulses which are 10 ns apart followed, followed by a 900 ns pause. Since 10 million 10 ps pulses are delivered each second to the FC stages, the duty cycle is 0.0001, which is a factor of 0.0067 times the duty cycle of the mode-locked seed laser. With the entire source laser system, including the pulse compressor, producing a time-averaged output of 10 W, the nominal pulse peak power is 100 kW, yielding excellent efficiency in the subsequent FC device. Using this source as 1 in the apparatus described in the first embodiment, the laser produces in excess of 2 W of 266 nm light with a waist intensity of about 20 GW/cm$^2$.

These examples illustrate SHG and mixing techniques using a seed source at 1064 nm. The fundamental oscillator wavelength may be varied to generate other downstream UV wavelengths. Average power, pulse duration and repetition rate of the source laser may vary, and the type of source laser may be mode-locked, non-mode-locked, DPSS, fiber-coupled, fiber-based, fiber, exciplex, or other laser type. Other schemes of linking FC stages may also be used and multiple sources may be used.

Figure 7A:
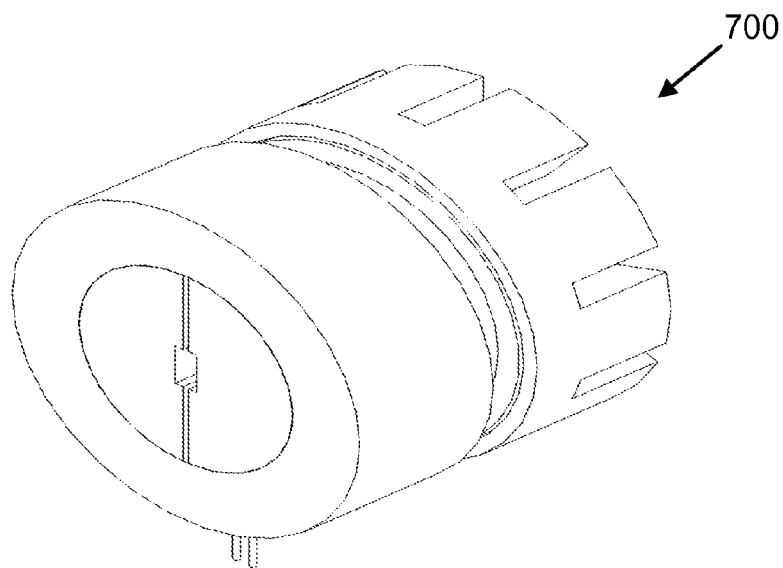
FIG. 7A is a simplified diagram of a crystal mount assembly for thermal control with a thermally-molded metallic form for enhanced thermal contact according to an embodiment of the present invention.

Another embodiment of the invention is an apparatus design where the NLO device is mounted in a thermally-molded metallic form for enhanced thermal contact and conduction under operational load, as viewed as assembly 700 in FIG. 7A. The FC crystal has two opposing facets to allow the light to enter and exit the crystal a thermally-conducting mount having a first side, a second side opposing the first side and a passage extending from the first side to the second side, wherein the passage defines a mounting surface; a nonlinear optical crystal having opposing facets having a component perpendicular to the propagation axis and an exterior surface extending between the opposing facets at a periphery of the nonlinear optical crystal, the nonlinear optical crystal being mounted in the thermally-conducting mount; and a solder containing a metal material disposed between the mounting surface of the thermally-conducting mount and the exterior surface of the nonlinear optical crystal.

Figure 7B:
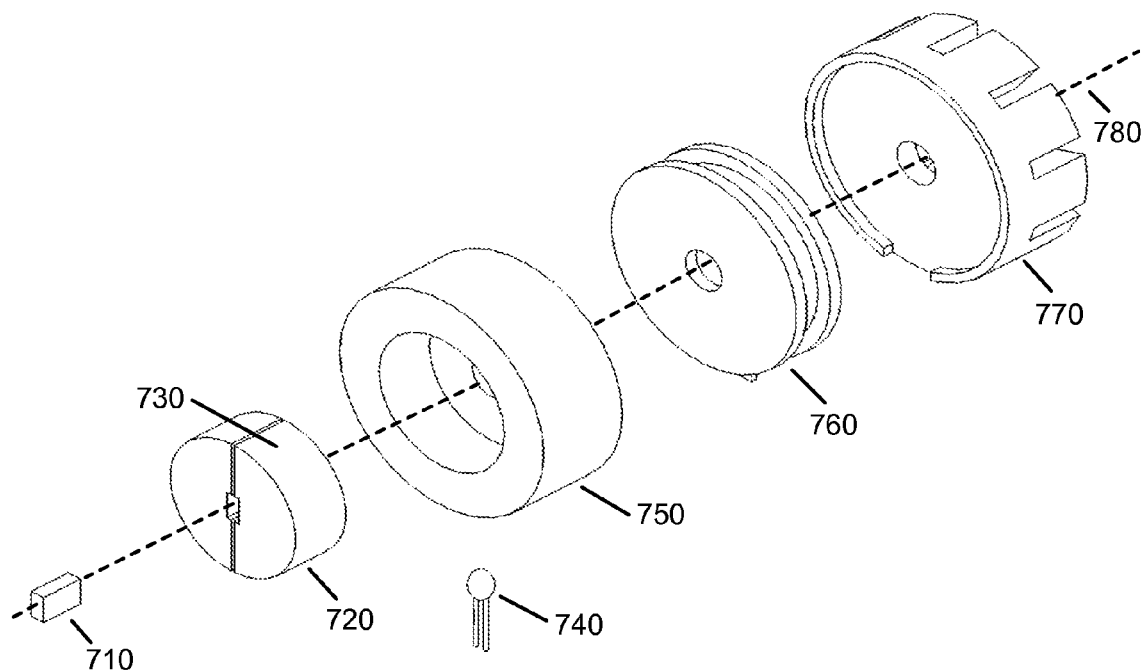
FIG. 7B is an exploded view of the thermal mount assembly illustrated in FIG. 7A.
Figure 8:
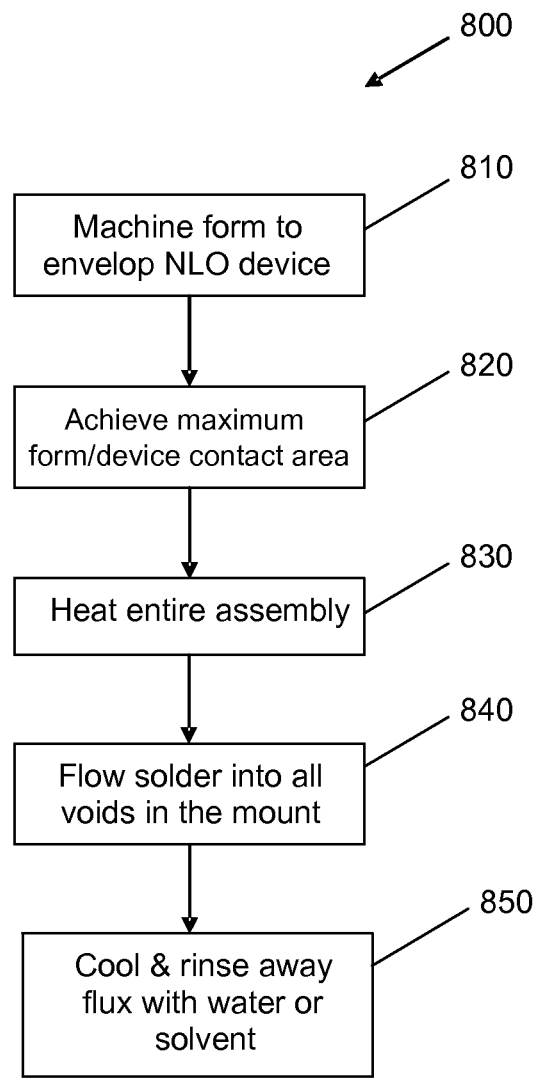
FIG. 8 represents a procedural method of making a crystal mount from a thermally-molded metallic form according to an embodiment of the present invention.

Combined with the NLO devices made from the preferred materials, this mount is used as components 11 and 17 in the previous embodiments. FIG. 7B represents an exploded view of the device mount components. The first step of the novel NLO device mounting procedure 800 of FIG. 8 is to fabricate one or more thermally-conductive forms 720 so that they may partially surround the NLO device 710 as in procedure 810. In step 820, a minimal air gap over the contact area is typically achieved for maximal NLO device surface area contact without impeding the axis of optical propagation 780. The NLO device 710 and its surrounding blocks 720 are fitted into its thermal holder 750. Together as a unit, they are heated from room temperature to about 525 K in about 1 hour, as procedure 830.

The third step involves the application of a metal solder 730, having a selected melting temperature of about 525 K and fluxing agents that are soluble in water or a solvent, to the contact areas of the unit {710, 720, 750} sufficient to cause the flow of the solder as procedure 840. Finally as 850, the unit is allowed to cool to room temperature and subsequently rinsed with water or a solvent to remove the remaining fluxing agents. A thermal detector 740 such as a thermistor is mounted in the wall of receiver 750 to serve as a signal source of temperature for thermal control of the unit. The unit {710, 720, 730, 740, 750} is affixed to a thermoelectric device 760 for thermal control. Heat pump 760 requires a thermal sink 770 to accept and distribute thermal energy. The combination of heat pump 760 and feedback signal 740 serves as precision control of temperature for NLO device 710. The device can also be configured and operated so as to reduce longitudinal thermal gradients in NLO device 710.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus for producing coherent, pulsed, ultraviolet light, the apparatus comprising:
    one or more source lasers configured to provide visible or near-infrared output radiation; and
    one or more frequency conversion stages, at least one of the one or more frequency conversion stages including a nonlinear critically phase-matched frequency conversion device and one or more optical elements including: a reflector, a focusing element, a polarization-controlling optic, a wavelength separator, or a fiber optic component; and
    wherein the nonlinear critically phase-matched frequency conversion device includes a huntite-type aluminum double borate nonlinear optical material producing frequency converted light having a wavelength between 190 and 350 nm and experiences a local peak intensity greater than 5 GW/cm$^2$ during operation.

2. The apparatus of claim 1 wherein the frequency converted light is output light of the apparatus.

3. The apparatus of claim 1 wherein the local peak optical intensity ranges from about 5-50 GW/cm$^2$.

4. The apparatus of claim 1 wherein the huntite-type aluminum double borate nonlinear optical material has a composition given by $RAl_3B_4O_{12}$, where R is one or a plurality of elements {Sc, La, Y, Lu}.

5. The apparatus of claim 4 wherein the composition is given by $Y_{(1-x)}La_xAl_3B_4O_{12}$, with $0 \leq x \leq 0.4$.

6. The apparatus of claim 5 wherein x is about 0.25.

7. The apparatus of claim 5 wherein x=0.

8. The apparatus of claim 4 wherein the composition is given by $Lu_{(1-x)}La_xAl_3B_4O_{12}$, with $0 \leq x \leq 0.4$.

9. The apparatus of claim 1 wherein the one or more source lasers comprises a single source laser having a nominal angular frequency $\omega$ and wherein an output of the apparatus includes one or more of nominal angular frequencies: $2\omega$, $3\omega$, $4\omega$, $5\omega$, $6\omega$, $7\omega$, or $8\omega$.

* * * * *